March 3, 1959

P. A. TOLLE 2,875,551

REMOVABLY MOUNTED FISHING LINE SINKERS

Filed Aug. 12, 1953

*INVENTOR.*
PAUL A. TOLLE
BY
ATTORNEY

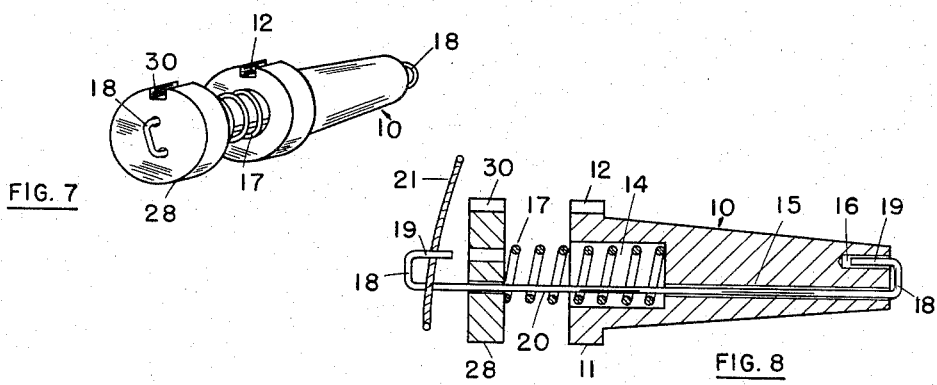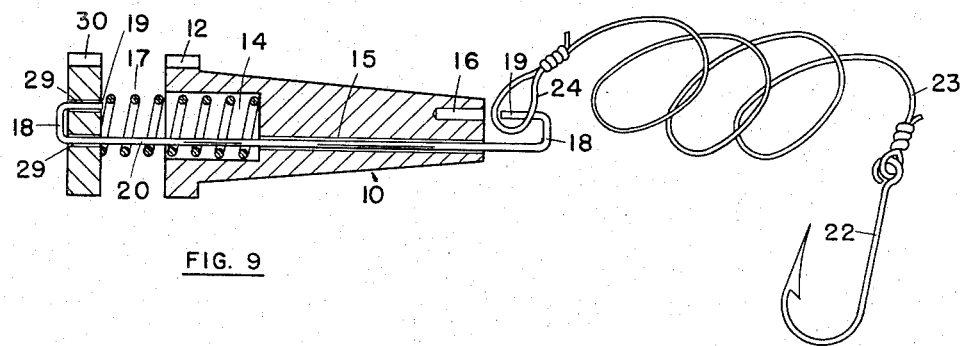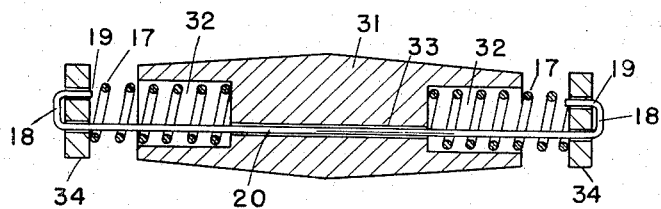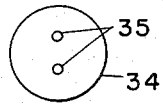

March 3, 1959 P. A. TOLLE 2,875,551
REMOVABLY MOUNTED FISHING LINE SINKERS
Filed Aug. 12, 1953 4 Sheets-Sheet 3

INVENTOR.
PAUL A. TOLLE
BY
ATTORNEY

March 3, 1959  P. A. TOLLE  2,875,551
REMOVABLY MOUNTED FISHING LINE SINKERS
Filed Aug. 12, 1953  4 Sheets-Sheet 4

INVENTOR.
PAUL A. TOLLE
BY
ATTORNEY

United States Patent Office 2,875,551
Patented Mar. 3, 1959

2,875,551

REMOVABLY MOUNTED FISHING LINE SINKERS

Paul A. Tolle, Dayton, Ohio

Application August 12, 1953, Serial No. 373,739

1 Claim. (Cl. 43—44.95)

The present invention relates to removably mounted fishing line sinkers and it consists in the combinations, constructions and arrangements of parts herein described and claimed.

Generally there is provided a sinker for fishing lines which may be quickly and easily mounted upon or removed from a fishing line and having novel means whereby, when once mounted upon such line, it becomes impossible for the sinker to be accidentally removed from such line. The device is adaptable also for attachment to the lower ends of nets. Several forms of the invention will be brought out in the appended specification.

It is accordingly an object of the invention to provide a novel sinker for fish lines and fish nets which sinker is provided with novel means for attaching the same to such lines or nets.

Another objects of the invention is to provide, in a device of the character set forth, novel means for preventing the accidental detachment of the same from its attached line or net.

Still another object of the invention is to provide, in a sinker device of the character set forth, novel means for substantially preventing the twisting or wrapping of the line to which such sinker is attached.

Another object of the invention is to provide a device of the character set forth which is simple in construction, inexpensive to manufacture and yet effective and efficient in use.

Other and further objects of the invention will become apparent from a reading of the following specification taken in conjunction with the drawing, in which.

Figure 1:
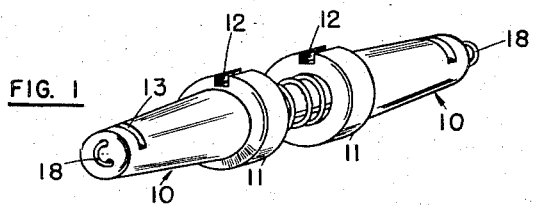
Fig. 1 is a perspective view of an embodiment of the invention.

Referring more particularly to the drawings, there is shown therein, in Figs. 1 to 5, inclusive, a sinker having a pair of identical body sections each generally designated at 10 and each being of generally frustoconical shape. The bodies 10 in the assembled device are in base-to-base relation to each other and each is provided at its base with an outwardly extending flange 11 having a longitudinal groove 12 therein. Each body section 10 is provided with a circumferentially extending arcuate groove 13 adjacent its outer end and each is provided with a cylindrical recess 14 centrally disposed in the base portion thereof. Each section 10 is provided with a longitudinal bore 15 which extends from the outer end thereof to the inner end of the recess 14 and each section 10 is likewise provided with an opening 16 extending from the outer end thereof through the slot 13 and for a short distance into the body of the section 10, as clearly shown in Fig. 2.

A compression spring 17 has its end portions extending into the recesses 14 of each of the sections 10. A longitudinal rod member 20 extending through the bores 15 and spring 17 is provided having U-shaped members 18 at each end thereof for engaging a fishing or leader line as described hereinafter, said U-shaped member each having a leg 19 which is relatively shorter than the opposed leg formed by the rod member 20, the latter being common to both U-shaped members 18.

Figure 2:
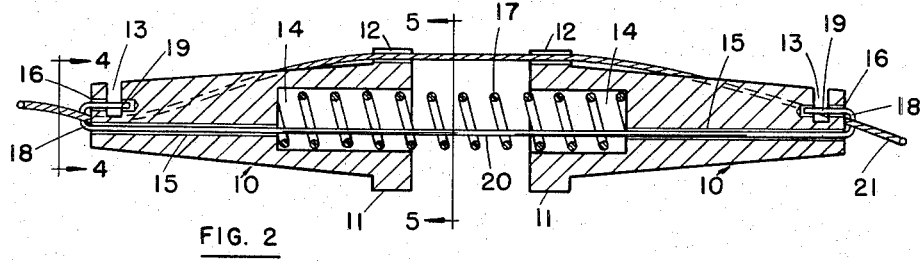
Fig. 2 is an enlarged vertical vertical longitudinal sectional view of the device shown in Fig. 1, illustrating the same in fully locked position.
Figure 3:
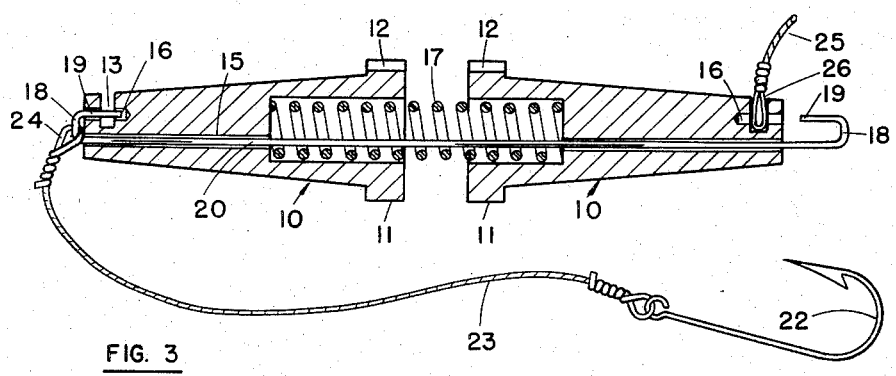
Fig. 3 is a view similar to Fig. 2 but illustrating the device thereof in partially opened position.
Figure 4:
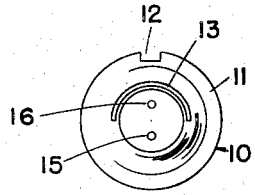
Fig. 4 is an end elevational view taken along line 4—4 of Fig. 2 with certain parts omitted.
Figure 5:
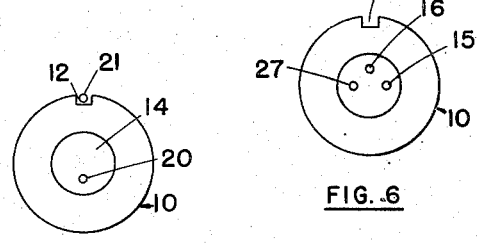
Fig. 5 is a sectional view taken substantially along line 5—5 of Fig. 2 with certain parts omitted.

In the operation of this form of the invention, when it is desired to attach the same to a fish line 21, for example, it is only necessary to move one of the sections 10 toward the other against the action of the compression spring 17, thus freeing the thus moved member from engagement with the shorter leg 19 of its associated U-shaped member 18 in the manner illustrated, for example, at the right hand side as in Fig. 3. The line 21 may then be engaged beneath the bight portion of the freed U-shaped member whereupon the body section which was moved may be allowed to reassume its original position, the leg 19 then moving through the opening 16. In order to more securely hold the line 21, it may be passed beneath the bight portion as aforesaid and wound through the slot 13 a single turn prior to allowing the leg 19 to reenter the opening 16. The line may then be passed through the slots 12 and the action just described repeated at the other end of the device. A sinker thus attached to the line 21 will hold itself in position against all accidental displacement thereof and will also frictionally hold itself in the position in which it is placed upon the line 21. In Fig. 3, the device shown in Figs. 1 and 2 is used with a fishing hook 22 having a leader 23 provided at its other end with a loop 24 and the fishing line 25 is likewise provided with a loop 26. In this case the loop 24 may be connected at one end of the device while the loop 26 is connected at the other end of the device in the manner just above described with regard to the fishing line 21. It will be apparent that at all times the spring 17 will maintain the U-shaped members in locked position as shown in Fig. 2 or at the left hand side of Fig. 3.

Figure 6:
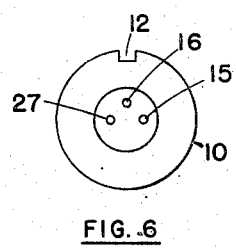
Fig. 6 is a view similar to Fig. 4 but showing a modified form thereof.
Figure 11:
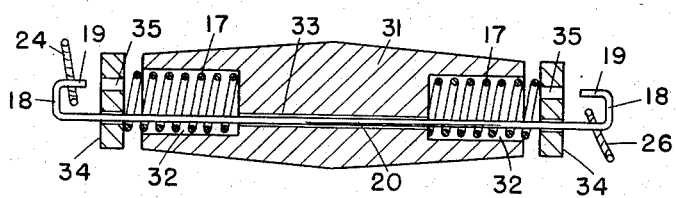
Figure 13:
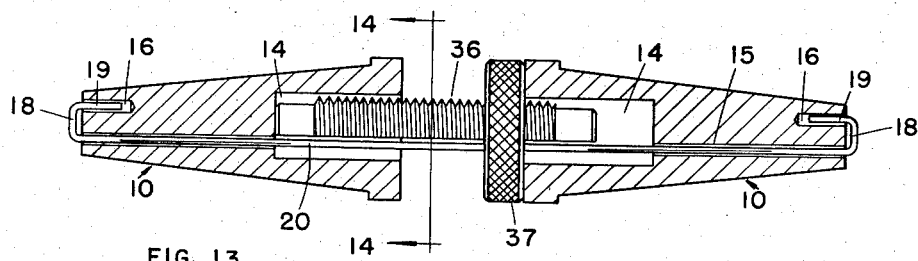
Figure 14:
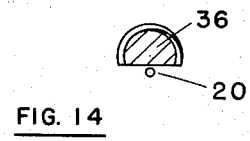
Figure 15:
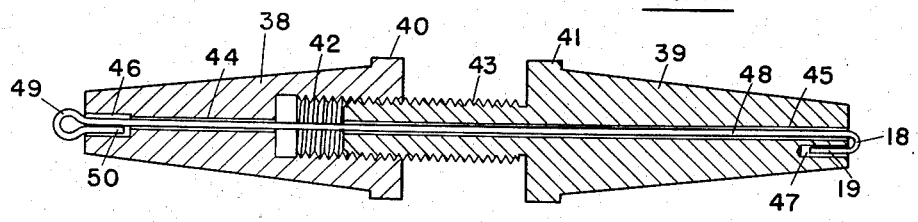
Figure 16:
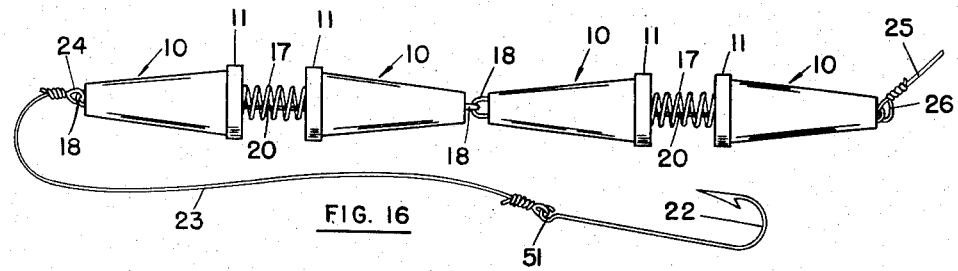
Figure 17:
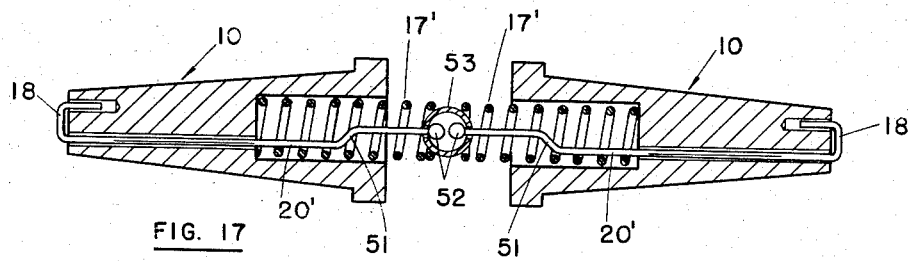
Figure 18:
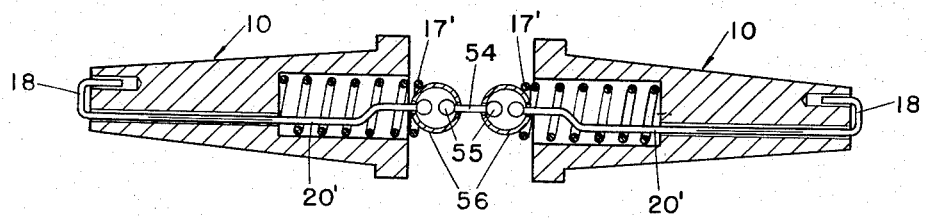
Figure 19:
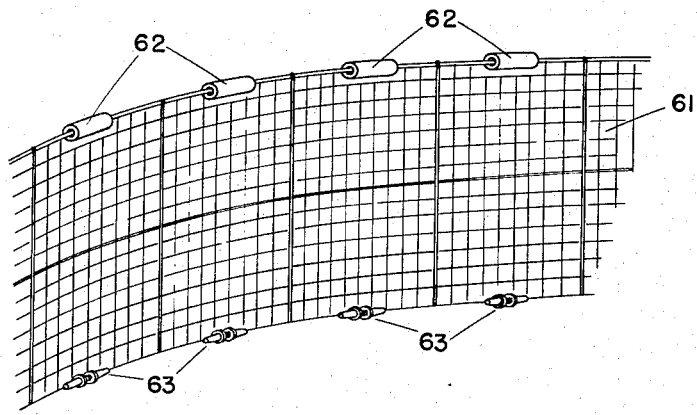

In Fig. 6 a slight modification of the device illustrated in Figs. 1 to 5, inclusive, is shown. Here in addition to the openings 15 and 16 a very shallow opening is provided in each outer end of each section 10. A purpose of the shallow opening 27 is to hold the shorter leg 19 in its unlocked position while the line 21 or the loops 24 and 26 are mounted upon the device prior to reinserting the leg 19 into the opening 16.

While but certain forms of the invention have been shown and described herein, it will be readily apparent to those skilled in the art that many minor modifications may be made without departing from the spirit of the invention or the scope of the appended claim.

I claim:

A sinker comprising a pair of longitudinally aligned body members each having a registering longitudinally disposed passageway therein and each having a leg-receiving opening in the outer end portion thereof, a longitudinal rod extending through said passageways, said rod having an inwardly directed leg formed integrally with each end thereof, said legs extending substantially into said leg-receiving openings for locking engagement therewith, said legs having a bent portion for securing a fishing line against the ends of said body members, and a compression spring surrounding said rod and bearing at each of its ends against the inner face of each body member, said body members each provided with a recess at its inner end for the reception therein of one end of said spring, and said body members each having an arcuate groove in the outer end portion thereof extending through said leg-receiving opening.

References Cited in the file of this patent

UNITED STATES PATENTS

| | | |
|---|---|---|
| 575,674 | Woodward | Jan. 19, 1897 |
| 1,463,020 | Olson | July 24, 1923 |
| 2,255,853 | Markus et al. | Sept. 16, 1941 |
| 2,488,475 | Merritt | Nov. 15, 1949 |
| 2,501,471 | Larson | Mar. 21, 1950 |
| 2,627,693 | Wanner | Feb. 10, 1953 |
| 2,706,869 | Shoenfelt | Apr. 26, 1955 |
| 2,716,832 | Minnie | Sept. 6, 1955 |

UNITED STATES PATENT OFFICE

CERTIFICATE OF CORRECTION

Patent No. 2,875,551 March 3, 1959

Paul A. Tolle

It is hereby certified that error appears in the above numbered patent requiring correction and that the said Letters Patent should read as corrected below.

In the drawings, the present sheets 2, 3, and 4 of the drawings were inadvertently entered as part of Letters Patent and should be canceled; in the heading to sheet 1 of the drawings, line 3, strike out "4 Sheets - Sheet 1".

Signed and sealed this 14th day of July 1959.

(SEAL)
Attest:

KARL H. AXLINE
Attesting Officer

ROBERT C. WATS(
Commissioner of Pate)